Sept. 27, 1966
R. T. BROKAW
3,274,736
EDGE TOOLING APPARATUS
Filed March 20, 1964
3 Sheets-Sheet 1
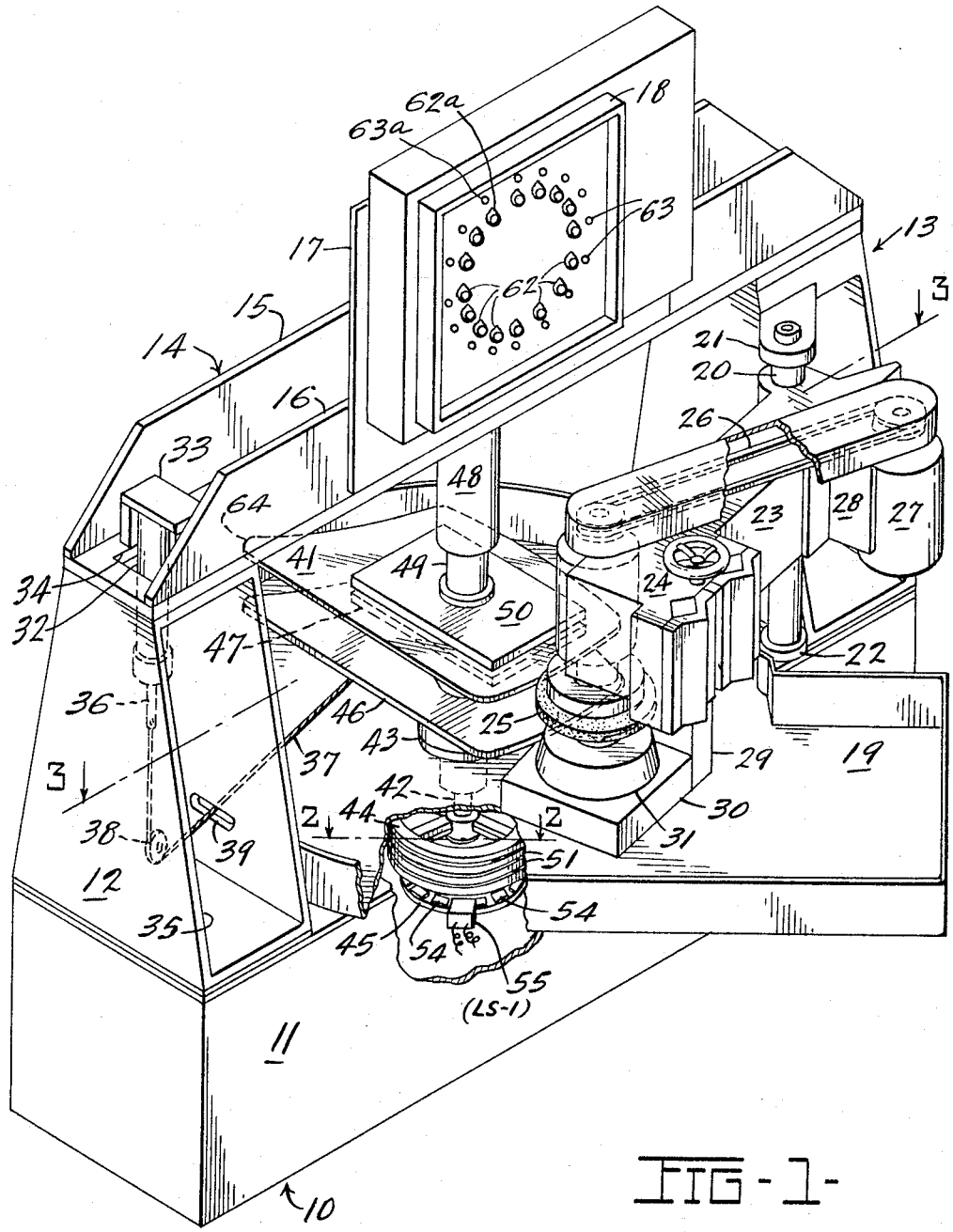
FIG-1-
INVENTOR:
ROSCOE THERON BROKAW.
BY
Owen & Owen
ATT'YS.

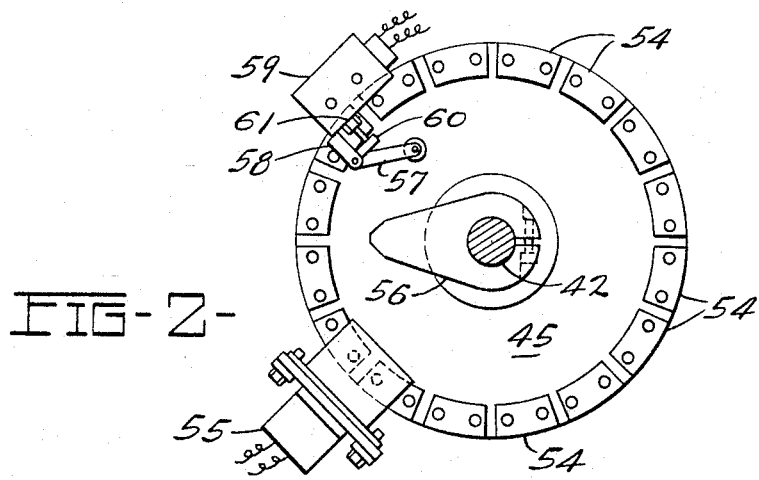
FIG-2-
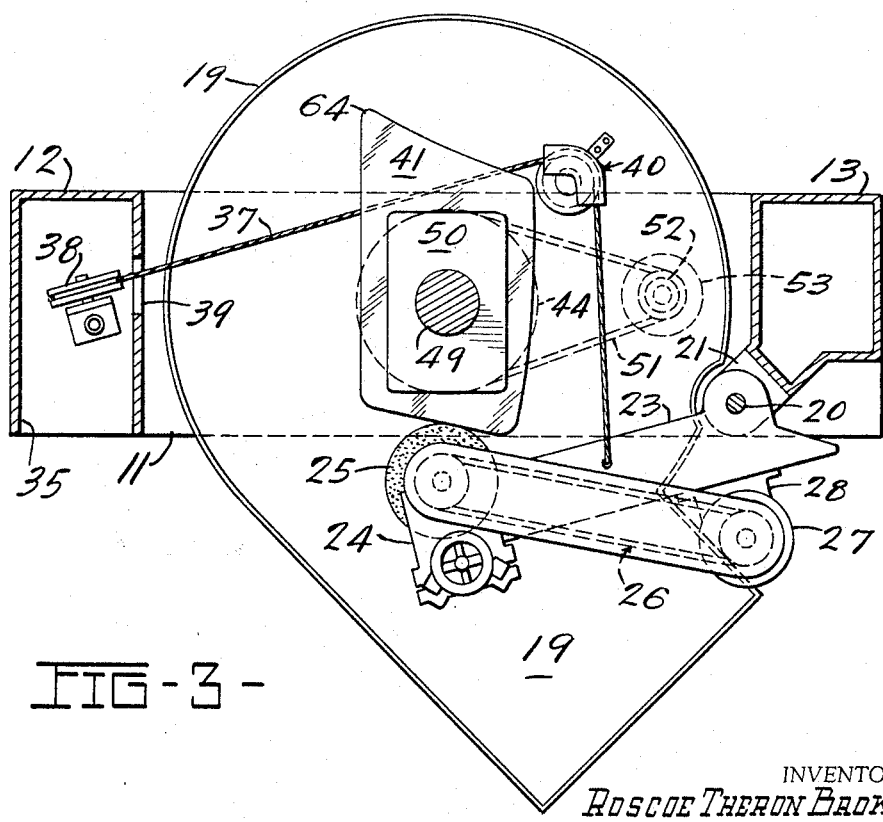
FIG-3-
INVENTOR:
ROSCOE THERON BROKAW.
BY
Owen & Owen
ATT'YS.

Sept. 27, 1966    R. T. BROKAW    3,274,736
EDGE TOOLING APPARATUS
Filed March 20, 1964    3 Sheets-Sheet 3
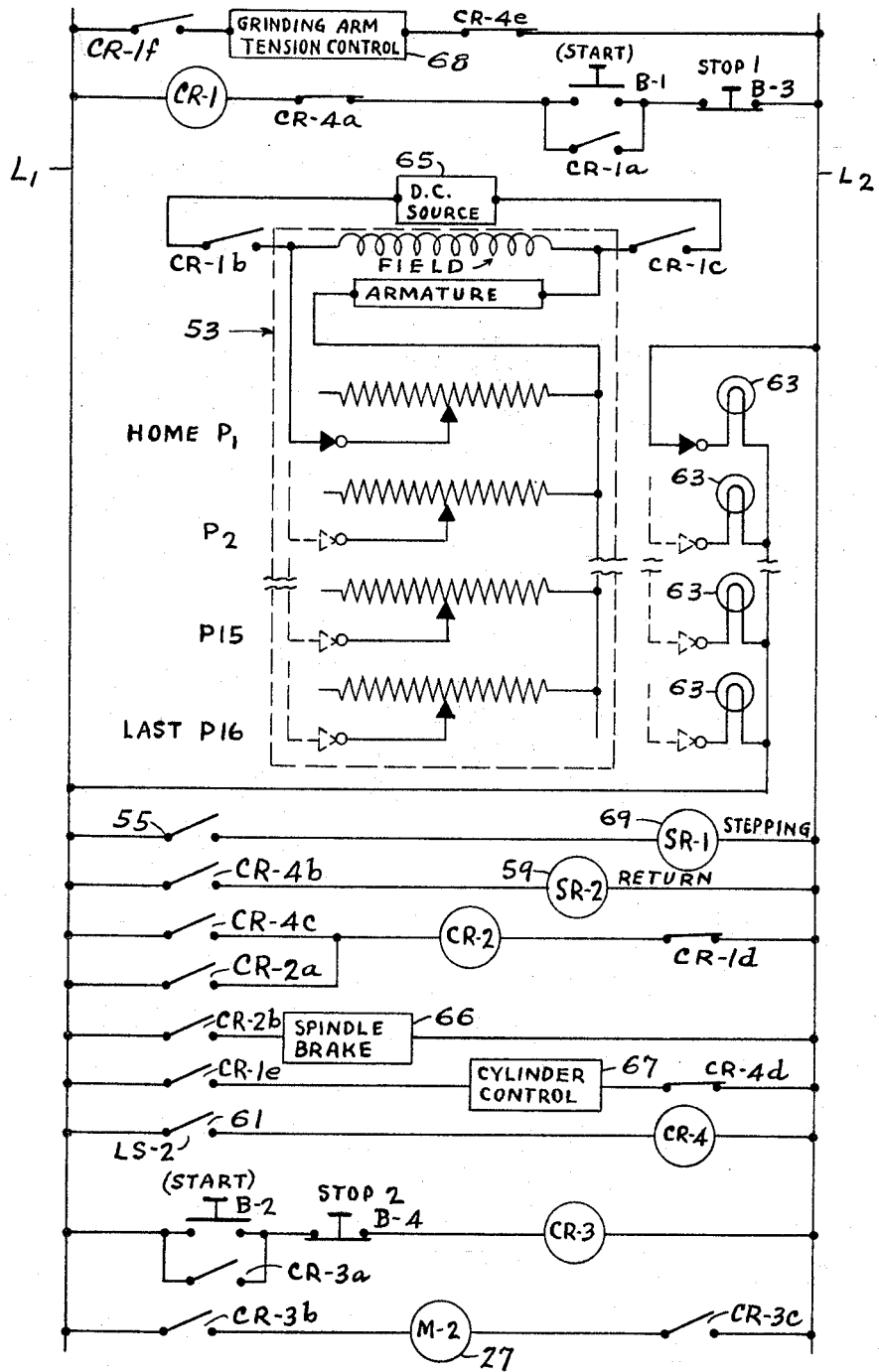
FIG-4-
INVENTOR:
ROSCOE THERON BROKAW.
BY
Owen & Owen
ATT'YS.

United States Patent Office

3,274,736
Patented Sept. 27, 1966

3,274,736
EDGE TOOLING APPARATUS
Roscoe Theron Brokaw, Ann Arbor, Mich., assignor to The Sun Tool & Machine Co., Toledo, Ohio, a corporation of Ohio
Filed Mar. 20, 1964, Ser. No. 353,404
7 Claims. (Cl. 51—105)

This invention relates to a method and an apparatus for edge tooling a generally planar workpiece by rotating the workpiece on an axis normal to its plane; the workpiece being unsymmetrical around its axis of rotation. More particularly, the invention relates to an improved edge grinding machine which closely controls and regulates the rotational speed of the workpiece to maintain an optimum peripheral speed of the workpiece relative to the grinding tool at the point of contact.

When a workpiece is edge-tooled, for example, edge-ground, it is desirable to grind the workpiece at the fastest rate possible consistent with a high quality finished product. The maximum grinding rate is limited by the allowable peripheral speed of the workpiece relative to the grinding wheel. If the peripheral speed of a sheet of glass, for example, is too great a "burning" effect takes place, which, in a severe case, can result in "chipping" of the workpiece.

If the workpiece is symmetrical around its axis of rotation, it can be edge ground at a *uniform* optimum rotational speed. This is possible because a symmetrical workpiece has a constant radius and therefore a constant peripheral speed at a constant rotational speed. However, if the workpiece is not symmetrical around its axis of rotation, the peripheral speed varies in relation to the distance of the tool from the rotational axis of the workpiece. The longer the radius, the higher the peripheral speed is at a constant rotational speed. Other factors which must be taken into consideration in determining the optimum rotational grinding speed are the edge configuration of the workpiece being ground, variations in thickness, and sharp corners on the workpiece where the grinding wheel may tend ot "jump off" or "over-run."

Because a constant rotational speed can not be maintained when grinding an irregular or unsymmetrical workpiece, the past practice has been to slow down the grinding operation so that optimum grinding speed occurred only at the point where the peripheral velocity of the workpiece relative to the grinding wheel was the greatest. For example, if the workpiece being edge ground had an extremely sharp corner far removed from the axis of rotation so that the peripheral speed of a workpiece relative to the rotational speed was greatest at this point, the rotational speed would be reduced to a speed at which the peripheral speed of the long radius corner was satisfactory. Therefore, while the grinding rate at the long radius corner was satisfactory, as the grinding wheel traversed the remainder of the periphery, the workpiece was edge ground at a rate far below the optimum grinding rate. For example, if the controlling long radius corner had a radius twice as great as the radius of a second point on the workpiece, because the rate of grinding of the entire workpiece was adjusted to obtain the optimum rate at the long radius corner, the grinding rate at the second point would be approximately one-half the theoretical optimum rate.

It is therefore a primary object of the instant invention to provide an improved method and apparatus for edge grinding an unsymmetrical workpiece.

It is another object of the invention to provide an edge grinding machine, for grinding an unsymmetrical workpiece, whereby the rotational speed of such workpiece may be varied as it passes through consecutive angular increments of rotation to compensate for varying radii of the piece and other variations in shape.

It is still another object of the invention to provide an edge grinding machine wherein the optimum grinding speed is automatically maintained throughout a grinding operation.

Further objects of this invention will become apparent from the following specification and drawings in which:

FIG. 1 is a front quarter view in perspective of a grinding machine embodying the instant invention, with parts broken away to show certain operating elements of the machine;

FIG. 2 is a partial, horizontal cross sectional view, taken along the line 2—2 of FIG. 1, and shown on an enlarged scale;

FIG. 3 is a horizontal cross sectional view taken along the line 3—3 of FIG. 1 shown on a reduced scale; and FIG. 4 is an illustrative electrical diagram for a machine according to the invention.

A grinding machine constructed according to the instant invention may have a shunt type direct current motor which drives a rotatable work table through a shaft connected thereto. Other variable speed driving mechanisms may be employed if desirable. Means are provided for securing a workpiece in grinding position for rotation. The edge grinding machine also includes a grinding wheel, means for rotating the wheel, and means for translating the grinding wheel relative to the axis of rotation of the workpiece. Switching means are provided for singly and consecutively connecting each of a series of potentiometers into the electrical circuitry of the direct current work table motor. Other means are provided for actuating the switching means at predetermined angular increments during each revolution of the workpiece, whereby the angular speed of such workpiece is varied as it passes through consecutive sectors as explained in detail below.

Referring to FIG. 1 of the drawings, an edge grinding machine embodying the invention is generally indicated by the reference number 10. The grinding machine 10 comprises a hollow, rectangular base 11 with end uprights 12 and 13 welded or otherwise mounted thereon. A bridge member 14 having vertical sidewalls 15 and 16 is mounted on and extends across between the upper ends of the uprights 12 and 13. A vertically extending support 17 having a control panel 18 mounted thereon is welded or otherwise secured to the outer surface of the sidewall 16.

A horizontal coolant pan 19 is mounted on the top of the base 11. A vertical pivot rod 20 is mounted in arm bearings 21 and 22 which are secured to the upright 13. A grinding wheel arm 23 is mounted on the pivot rod 20 and includes a spindle head 24 at its free end. A grinding wheel 25 is rotatably mounted by a spindle (not shown) which is journaled in the head 24. A pulley on the upper end of the spindle is rotated by a belt 26 which is also engaged with a pulley (not shown) on the output shaft of a grinding motor 27. The grinding motor 27 is mounted on the grinding wheel arm 23 by a bracket 28.

An L-shaped bracket 29 having a horizontally extending leg 30 depends from the spindle head 24. The leg 30 mounts a cam follower 31 coaxially with, but vertically spaced from, the grinding wheel 25.

A fluid cylinder 32 depends from a bracket 33 mounted on the bridge member 14 at a location above the upright 12. The fluid cylinder 32 extends through a hole 34 in the bridge member 14 and into a recess 35 provided in the upright 12. The lowermost end of a retractable piston rod 36 of the cylinder 32 is connected to one end of a grinding arm tension cable 37. The cable 37 extends downwardly around an idler pulley 38 (see FIG.

3) and through a hole 39 provided in the innermost wall of the upright 12. The cable 37 then passes around a second, horizontal, idler pulley 40 which is mounted on the coolant pan 19. The end of the cable 37 is connected to the grinding wheel arm 23.

When the cylinder 32 is actuated the rod 36 moves upwardly causing the cable 37 to translate the arm 23 into grinding position bringing the grinding wheel 25 against a workpiece 41 with a controlled pressure as is shown in FIGS. 1 and 2. When the grinding cycle has been completed the cylinder rod 36 moves downwardly to release the tension on the cable 37 and the grinding wheel arm, which is spring biased away from the work, is swung outwardly. With the grinding arm 23 away from the work, an operator can remove the finished workpiece 41 from the edge grinding machine 10 and position a new workpiece blank within the edge grinding machine 10 without stopping the grinding wheel motor 27.

Referring to FIG. 1, a workpiece shaft 42 is journaled in a bearing 43 which is disposed in a hole provided in the top portion of the hollow base 11. A pulley 44 is pinned or otherwise mounted on a lower portion of the shaft 42 and a circular indicator plate 45 is pinned to the lowermost end of the shaft 42. At a point above the top of the hollow base 11, a cam 46 having the outline of the finished workpiece is releasably attached for rotation with the workpiece shaft 42. The cam 46 is positioned at a level such that the cam follower 31 engages the periphery of the cam 46 when the grinding wheel 45 is in a grinding position. A rectangular work table 47, indicated by dashed lines in FIG. 1, is fixedly secured to the upper end of the workpiece shaft 42.

A clamping cylinder 48 depends from and is mounted on the bottom of the bridge member 14 and has a vertically reciprocating piston rod 49 located therein. The piston rod 49 mounts a horizontal clamping block 50, which is similar in shape and in size to the work table 47. The workpiece 41 is clamped between the work table 47 and the clamping block 50 during the grinding operation.

The pulley 44 carries a belt 51 which is driven by a drive pulley 52 pinned or otherwise secured to the output shaft of a shunt type direct current work table motor 53 (see dashed lines in FIG. 3).

Referring to FIG. 2, the indicator plate 45 has a plurality of magnetic actuators 54 on its upper surface along its periphery. One of the actuators 54 is mounted at a precise location in each predetermined angular sector of the circular indicator plate 45. The instant embodiment shows an indicator plate divided into sixteen equal angular sectors. The number of angular divisions and the corresponding number of actuators 54 depend upon the number of variations in radius and the shape of the workpiece 41 to be ground. If the workpiece 41 is extremely unsymmetrical about its axis of rotation, a greater number of sectors and corresponding actuators 54 is required. As will be described below, the angles circumscribed by consecutive sectors can vary, depending upon the particular shape or asymmetry of the workpiece being edge ground.

A magnetic limit switch 55 is mounted on the bottom of the base 11 adjacent the indicator plate 45 and is serially actuated by the magnetic actuators 54 as the workpiece shaft 42 and the indicator plate 45 rotate. Each time the limit switch 55 is actuated, a selected potentiometer is placed in the work table motor circuit and another potentiometer is removed from the circuit, as will be described below.

A cam 56 is mounted on the workpiece shaft 42 slightly above the indicator plate 45 and revolves with the shaft 42. When the end of a particular grinding cycle is reached, the cam 56 engages the end of an arm 57 which is pivotally mounted on a bracket 58 of a return relay mechanism 59. The return relay mechanism 59 is mounted adjacent the indicator plate 45 on the base 11. A second arm 60 which moves with the arm 57 is also pivotally mounted at the outer end of the bracket 58. When the arm 57 is moved outwardly toward the periphery of the indicator plate 45, the arm 60 trips a limit switch 61 which actuates the return relay mechanism 59 to a start position for the next grinding cycle.

Referring to FIG. 4, in a typical grinding operation, a series of potentiometers P-1, P-2, etc., are singly and consecutively connected in series with the armature resistance of the shunt type direct current work table motor 53. The addition of the potentiometer resistance to the armature resistance controls the speed of the motor 53. Prior to the grinding operation, the workpiece 41 is laid out in angular increments. For example, in the instant embodiment, the workpiece 41 is laid out into sixteen angular sectors. As will be discussed below, these sectors are not necessarily equal. The length of the individual radii are then measured and the potentiometers P-1, P-2, etc. are initially positioned in direct proportion to the length of the radii. For example, if one radius is twice as long as another, the respective potentiometers controlling those sectors are initially set so that there will be twice as much armature resistance in the motor circuit during rotation through the sector containing the long radius as there is during travel through the sector containing the shorter radius. However, because of other factors, such as variations in the thickness of the workpiece being ground and the effect of "sharp corners," this initial setting is only an approximation. A series of potentiometer control knobs 62 is mounted on the control panel 18 (see FIG. 1). Each of the control knobs 62 controls an individual potentiometer P-1, P-2, etc. Indicator lights 63 are positioned adjacent the control knobs 62 on the control panel 18. The indicator lights 63 indicate which of the potentiometers P-1, P-2, etc. is connected to the work table motor circuit at any given time during a grinding cycle. Therefore, after each of the potentiometers P-1, P-2, etc. has been initially set in accordance with the length of the radius in each of the particular angular sectors, the workpiece 41 is placed in its "home" grinding position and the grinding cycle is started. At this time the operator adjusts the control knobs 62 to insure optimum grinding speed in all consecutive sectors throughout a revolution of the workpiece 41. For example, the workpiece 41 as shown in FIG. 3, has a sharp corner 64. As was mentioned previously, when a sharp corner is approached there is a tendency for the grinding wheel 25 to "overrun" such a corner. As the sector of the workpiece 41 containing the sharp corner 64 approaches the grinding wheel 25, an indicator light 63a on the control board 18 will light, thereby informing the operator that the control knob 62a controls the potentiometer which is in the work table motor circuit when the sector containing the sharp corner 64 is in grinding position. The operator in this instance, turns the control knob 62a, which increases the effective resistance of the controlling potentiometer, thereby placing more resistance in series with the armature resistance and slowing down the work table motor 53. Therefore, the instant invention not only provides for predetermined *ranges* of grinding speed, but also provides for fine adjustments within the ranges. More angular sectors of control are provided at locations where the workpiece has sharp corners or extremely long radii. For example, at a sharp corner, such as the sharp corner 64, it is possible to adjust the angular sectors in such a manner that a potentiometer is placed into the motor circuit and the preceding one removed from the motor circuit at every 5° angular increment of rotation, whereas if the radii are constant or approximately constant throughout, only one or possibly two potentiometers would be needed to control, and thereby obtain optimum grinding speed through a sector of, for example, 50°.

After the potentiometers have been initially adjusted to their preferred ranges based on the length of the radii and the fine adjustments have been made to compensate for the other factors, such as sharp corners, etc., a workpiece blank is positioned upon the work table 47.

Referring to FIG. 4, lines L1 and L2 supply alternating current to the electrical system and a D.C. source 65 supplies direct current to the work table motor circuit. Closing start button B–1 energizes control relay CR1 which closes contacts CR1–a (hold-in circuit), CR1–b, and CR1–c, which energizes the circuit to the work table motor 53. The control relay CR1 also momentarily opens a contact CR1–d to deenergize a control relay CR2, thereby opening contacts CR2–a and CR2–b to deenergize a spindle brake circuit and thereby release a spindle brake 66. Only shown in FIG. 4.) At the same time control relay CR1 closes a contact CR1–e to energize a circuit to a cylinder control 67 which actuates the clamping cylinder 48, thereby moving the clamping block 50 into a "hold" position. Simultaneously, a contact CR1–f is closed by the control relay CR1 to energize a circuit to a grinding arm tension control 68 which in turn actuates the cylinder 32 thereby moving the grinding wheel 25 into grinding position as previously explained.

The simultaneous closing of a button B–2 energizes a control relay CR3 closing contacts CR3–a (hold-in circuit), CR3–b, and CR3–c to supply power to the grinding motor 27.

Only four of the potentiometers, namely potentiometer P–1, which is the "home" station, P–2, P–15 and P–16 are shown. However, each of the omitted potentiometers is connected to the electrical circuit in an identical manner. As the workpiece 41 rotates, the limit switch 55 is actuated at predetermined angular increments by each of the magnetic actuators 54 to energize an elctro-mechanical stepping relay 69 (shown only in FIG. 4) which "steps" successive potentiometers P–1, P–2, etc. singly and consecutively into the work table motor circuit, each of the potentiometers being placed in series with the armature resistance, thereby controlling the speed of the work table motor 53. At the same time, the stepping relay 69 also singly and consecutively energizes a complementary one of the indicator lights 63 which are mounted on the control panel 18. As has previously been explained, the indicator lights 63 are provided so that the operator can look at the control panel 18 at any time and tell immediately which one of the potentiometers is, at that instant, connected in the work table motor circuit.

When the workpiece 41 has rotated to the end of the grinding cycle, the cam 56 (FIG. 2) engages the arm 57 actuating the limit switch 61, thereby energizing a control relay CR4. The control relay CR4 momentarily opens a contact CR4–a, thereby deenergizing control relay CR1 and opening the contacts CR1–a, CR1–b and CR1–c, thus opening the D.C. power circuit to the work table motor 53. Secondly, the control relay CR4 momentarily closes a contact CR4–b to energize the return relay mechanism 59 which recycles the stepping relay 57 to its "home" position, whereby the potentiometer P–1 is placed in the work table motor circuit for the start of a new cycle.

Simultaneously, the control relay CR4 momentarily closes a contact CR4–c energizing the relay CR2 which in turn closes the contacts CR2–a (hold-in circuit) and CR2–b which energizes a circuit to the spindle brake 66 to stop the work table 47 in its "home" position.

The control relay CR4 also momentarily opens a contact CR4–d thereby deenergizing the circuit to the cylinder control 67 which in turn releases and retracts the clamping cylinder 68 to permit removal of the finished workpiece 41 and insertion of a new workpiece blank.

Lastly, the control relay CR4 momentarily opens a contact CR4–e, deenergizing the tension control 68, which in turn releases the fluid cylinder 32 allowing the spring biased grinding wheel arm 23 to move outwardly.

Stop buttons B3 and B4 are provided in the work table motor circuit and the grinding motor circuit, respectively, to enable an emergency opening of the circuits in case there is unexpected trouble during the grinding operation.

While the present invention has been disclosed in connection with a specific arrangement and disposition of the parts, it should be expressly understood that numerous modifications and changes may be made without departing from the scope of the intended claims.

What I claim is:

1. In a machine for edge tooling a generally planar workpiece which is unsymmetrical about an axis of rotation normal to the plane of such workpiece, a speed control device comprising, in combination, means for rotating such workpiece on such axis, switching means, a plurality of variable speed control means responsive to said switching means and means for actuating said switching means at predetermined angular increments of each revolution of such workpiece, whereby the angular speed of such workpiece is separately controlled as it passes through consecutive angular increments.

2. Apparatus according to claim 1, wherein each of said speed control means has means for selecting an individual speed control range, and individual adjusting means for controlling the speed of rotation of such workpiece within its individual speed control range.

3. In a machine in which the workpiece is rotated by a motor for presentation to a tool, a variable speed control for such workpiece comprising, in combination, an indicator plate, a plurality of adjustable sector indicating members secured along the periphery of said indicator plate, a variable speed control means, and switching means actuated by said sector indicating members for placing said variable speed control in effect to maintain a selected constant speed of workpiece rotation as the workpiece rotates through each selected sector of rotation.

4. In an edge grinding machine for grinding an irregular workpiece which is unsymmetrical about its rotational axis, said machine having motor means for rotating such workpiece on such axis, a variable speed control comprising, in combination, an indicator plate rotatable with such workpiece, a plurality of adjustable sector indicating members attached to the periphery of said indicator plate, a plurality of individually connectable potentiometer units in circuit with said motor for controlling the rotational speed of such workpiece, and switching means mounted adjacent the periphery of said indicator plate, said switching means being actuatable by said adjustable sector indicating members for connecting each of said potentiometer units in the circuit of said motor during rotation through a selected angular increment.

5. In a machine for edge grinding a generally planar workpiece which is unsymmetrical about an axis of rotation normal to the plane of such workpiece, said grinding machine having a direct current motor, a rotatable workpiece shaft driven by said motor, means for securing a workpiece in grinding position on said shaft for rotation on such axis, an edge grinding wheel and means for rotating said wheel on an axis parallel to said axis of rotation of such workpiece and means for translating said grinding wheel relative to the axis of rotation of such workpiece, the improvement comprising, in combination, a plurality of potentiometers, each of said potentiometers being selectively connectable in circuit with said motor, switching means for singly and consecutively connecting each of said potentiometers into such circuit, means for actuating said switching means at predetermined angular increments of each revolution of such workpiece, whereby the angular speed of such workpiece is separately controlled as it passes through each of the consecutive angular increments.

6. Apparatus according to claim 5 wherein said switching means is an electro-mechanical stepping relay and said means for actuating said switching means comprises an indicator plate rotatable with said workpiece shaft, a plurality of adjustable sector indicating members attached to the periphery of said indicator plate and means adjacent such periphery responsive to each of said indicating members for actuating said stepping relay.

7. Apparatus according to claim 5 and a plurality of indicator lights, each of said indicator lights being selectively connectable in circuit with said motor, said switching means singly and consecutively connecting one of said indicator lights into such circuit simultaneously with one of said potentiometers.

References Cited by the Examiner
UNITED STATES PATENTS 2,579,337  12/1951  Reaser et al. _____ 51—101
2,627,593  2/1953   Teitig _____ 318—164

ROBERT C. RIORDON, *Primary Examiner.*

LEONARD S. SELMAN, *Examiner.*